United States Patent
Kuge et al.

(10) Patent No.: US 10,136,407 B2
(45) Date of Patent: Nov. 20, 2018

(54) BASE STATION DEVICE, FIRST LOCATION MANAGEMENT DEVICE, TERMINAL DEVICE, COMMUNICATION CONTROL METHOD, AND COMMUNICATION SYSTEM

(71) Applicant: SHARP KABUSHIKI KAISHA, Sakai, Osaka (JP)

(72) Inventors: Yoko Kuge, Osaka (JP); Masafumi Aramoto, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/320,957

(22) PCT Filed: Jun. 29, 2015

(86) PCT No.: PCT/JP2015/068624
§ 371 (c)(1),
(2) Date: Dec. 21, 2016

(87) PCT Pub. No.: WO2016/002692
PCT Pub. Date: Jan. 7, 2016

(65) Prior Publication Data
US 2017/0164317 A1    Jun. 8, 2017

(30) Foreign Application Priority Data

Jul. 1, 2014  (JP) .................................. 2014-135495

(51) Int. Cl.
*H04W 76/10*       (2018.01)
*H04W 64/00*       (2009.01)

(52) U.S. Cl.
CPC ......... *H04W 64/003* (2013.01); *H04W 76/10* (2018.02)

(58) Field of Classification Search
CPC .... H04W 76/02; H04W 64/003; H04W 76/10
See application file for complete search history.

(56) References Cited

U.S. PATENT DOCUMENTS

2013/0267229 A1* 10/2013 Gopalakrishnan ...........................
H04W 36/0061
455/436

OTHER PUBLICATIONS

International Patent Application No. PCT/JP2015/068624, International Preliminary Report on Patentability dated Jan. 12, 2017, 12 pages.

(Continued)

*Primary Examiner* — Christopher M Brandt
(74) *Attorney, Agent, or Firm* — Kilpatrick Townsend & Stockton LLP

(57) ABSTRACT

Provided are a communication control method and the like for enabling a terminal device to connect to a core network and move in a communication system in which multiple core networks are overlaid. A base station device receives a tracking area update request, determines a location management device to connect to on the basis of a setting in the base station device, and transmits a tracking area update request. The location management device requests information pertaining to a terminal device to the location management device to which the terminal device was connected prior to moving, and then the location management device to which the terminal device was connected prior to moving or the location management device which received the tracking area update request from the base station device determines whether resetting of the location management device is necessary. Thus, it is possible to control which core network the terminal device connects to.

8 Claims, 8 Drawing Sheets

(56) References Cited

OTHER PUBLICATIONS

"Addition of Subscription Information for Selecting a Specific Network," SA WG2 Meeting #99, Xiamen, China, Sep. 23-27, 2013, pp. 1-8, S2-133742, NTT Docomo, Vodafone, Telecom Italia, China Mobile.

"3GPP TS 23.401 V12.4.0 (Mar. 2014) Technical Specification: $3^{rd}$ Generation Partnership Project; Technical Specification Group Services and System Aspects; General Packet Radio Service (GPRS) enhancements for Evolved Universal Terrestrial Radio Access Network (E-UTRAN) access (Release 12)," 2014, pp. 1-302, 3GPP Organizational Partners, Valbonne, France.

"P-CR on Solution 1: Redirection Solution," SA WG2 Meeting #103, Phoenix, Arizona, USA, May 19-23, 2014, pp. 1-7, S2-141710, NTT Docomo.

"P-CR on on Re-routing before NAS security setup," SA WG2 Meeting #103, Phoenix, Arizona, USA, May 19-23, 2014, pp. 1-3, S2-141676, Ericsson.

International Patent Application No. PCT/JP2015/068624, International Search Report dated Sep. 8, 2015, 4 pages.

European Patent Application No. EP 15814108.5, European Extended Search Report dated Mar. 7, 2017, 6 pages.

"Addition of Subscription Information for Selecting a Specific Network," SA WG2 Meeting #99, Xiamen, China, Sep. 23-27, 2013, pp. 1-48, S2-133742, NTT Docomo, Vodafone, Telecom Italia, China Mobile.

* cited by examiner

MME INFORMATION

| MME IDENTIFICATION INFORMATION | AREA | CORE NETWORK TYPE |
|---|---|---|
| GUMMEI(A) | A | TYPE 1 |
| GUMMEI(B) | A | TYPE 2 |
| GUMMEI(C) | B | TYPE 1 |
| GUMMEI(D) | B | TYPE 2 |

CONTEXT INFORMATION

| UE IDENTIFICATION INFORMATION | CONTEXT |
|---|---|
| UE ID A | CONTEXT A |
| UE ID B | CONTEXT B |

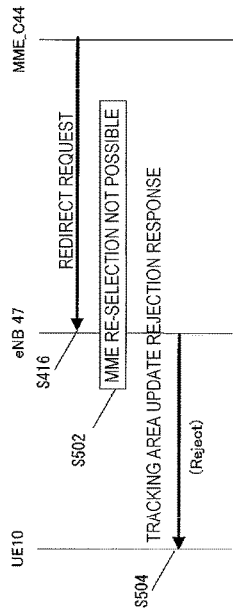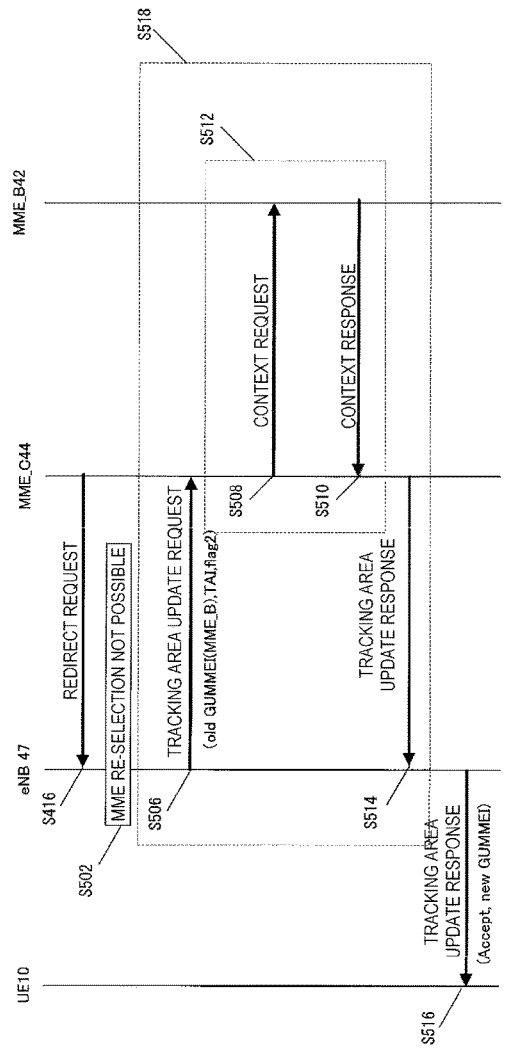
FIG. 7A
FIG. 7B

BASE STATION DEVICE, FIRST LOCATION MANAGEMENT DEVICE, TERMINAL DEVICE, COMMUNICATION CONTROL METHOD, AND COMMUNICATION SYSTEM

CROSS REFERENCE TO RELATED APPLICATIONS

This application is the U.S. national phase of International Application No. PCT/JP2015/068624 filed on Jun. 29, 2015, and published in Japanese on Jan. 7, 2016, as International Publication No. WO 2016/002692 A1, which application claims priority to Japanese Patent Application No. 2014-135495 filed on Jul. 1, 2014, the contents of all of which are incorporated herein by reference.

TECHNICAL FIELD

The present invention relates to a base station device, a first location management device, a terminal device, a communication control method, and a communication system.

BACKGROUND ART

The 3rd Generation Partnership Project (3GPP), which undertakes activities for standardizing recent mobile communication systems, is in the process of creating specifications for the Evolved Packet System (EPS), which realizes an all-IP architecture (see NPL 1). EPS is a mobile communication system through which mobile operators and the like provide mobile telephone services, and is structured including a core network called the Evolved Packet Core (EPC), an access network based on the Long Term Evolution (LTE) radio communication standard, and the like.

In developing the specifications for EPS, the 3GPP is furthermore considering dedicated core networks (DECOR) for the purpose of overlaying core networks. With DECOR, a communication system is configured by overlaying multiple networks, and terminal devices connect to different networks depending on the type of terminal and the like. This configuration makes it possible to distribute terminal traffic on the basis of terminal type, and manage traffic on the basis of the type of terminal type.

For example, it is possible to realize a use case where machine to machine (M2M) terminals, which are more prevalent recently, connect to an M2M-specific core network, whereas normal mobile telephone terminals such as smartphones connect to a main core network.

CITATION LIST

Non Patent Literature

NPL 1: 3GPP TS23.401 Technical Specification Group Services and System Aspects, General Packet Radio Service (GPRS) enhancements for Evolved Universal Terrestrial Radio Access Network (E-UTRAN) access (Release 12)

SUMMARY OF INVENTION

Technical Problem

DECOR prescribes that the main core network is separated from overlaid core networks on the basis of the characteristics of terminal devices. These core networks are configured with different mobile management devices included therein.

As such, it is necessary to appropriately select the core network to which a terminal device is to connect on the basis of the type, characteristics, and the like of the terminal. To do so, it is necessary for a location management device to be selected appropriately on the basis of the type, characteristics, and the like of the terminal.

However, there is at present no clear means for appropriately selecting a core network on the basis of the type, characteristics, and the like of the terminal, connecting a terminal to the selected core network, and continuing communication.

For example, no method has been disclosed in which, in a tracking area update (TAU) procedure executed when a terminal that has connected to a core network has transited to an idle mode and moved, the terminal remains connected to the same core network among the multiple overlaid core networks that are configured.

In light of such circumstances, an object of the present invention is to provide a favorable means, in a mobile communication system in which multiple overlaid core networks are configured, for a terminal to connect to an appropriate core network and carry out mobile communication.

Solution to Problem

A base station device according to the present invention is a base station device that connects to a first core network including a first location management device and a second core network including a second location management device and a third location management device. The base station device includes a receiver and a transmitter. The receiver receives a first tracking area update request message including at least identification information on a terminal device and identification information on the second location management device, from the terminal device, receives a redirect request message transmitted by the first location management device, and receives a tracking area update response message transmitted by the third location management device, the tracking area update response message being a response to a third tracking area update request message and including at least identification information identifying the third location management device. The transmitter transmits a second tracking area update request message including at least the identification information on the second location management device to the first location management device on the basis of reception of the first tracking area update request message, transmits the third tracking area update request message to the third location management device on the basis of reception of the redirect request message, and transmits a tracking area update response message including at least the identification information identifying the third location management device to the terminal device in response to reception of the tracking area update response message, the tracking area update response message being a response to the first tracking area update request message.

A base station device according to the present invention is a base station device that connects to a first core network including a first location management device and a second core network including a second location management device and a third location management device. The base station device includes a receiver and a transmitter. The receiver receives a first tracking area update request message including at least identification information on a terminal device and identification information on the second location management device, from the terminal device, and receives a redirect request message transmitted by the first location management device. The transmitter transmits a second tracking area update request message including at least the identification information on the second location management device to the first location management device on the basis of reception of the first tracking area update request message, and in the case where there is no connectivity with the second core network, transmits a tracking area update response message including at least identification information identifying the first location management device to the terminal device in response to reception of the redirect request message, the tracking area update response message being a response to the first tracking area update request message.

A location management device according to the present invention is a location management device deployed in a first core network and connected to a base station device. The location management device includes a receiver and a transmitter. The receiver receives a first tracking area update request message including at least identification information on a terminal device and identification information on a second location management device deployed in a second core network, from the base station device, and receives, from the second location management device, a context response message including at least identification information indicating a redirect to a location management device deployed in the second core network that is different from the second location management device, the context response message being a response to a context request message. The transmitter transmits the context request message requesting a context of the terminal device to the second location management device, and transmits, to the base station device, a redirect request message requesting a redirect to a location management device deployed in the second core network that is different from the second location management device, on the basis of reception of the context response message.

A communication control method for a base station device according to the present invention is a communication control method for a base station device that connects to a first core network including a first location management device and a second core network including a second location management device and a third location management device. The method includes at least the steps of: receiving a first tracking area update request message including at least identification information on a terminal device and identification information on the second location management device, from the terminal device; transmitting a second tracking area update request message including at least the identification information on the second location management device to the first location management device on the basis of reception of the first tracking area update request message; receiving a redirect request message transmitted by the first location management device; transmitting a third tracking area update request message to the third location management device on the basis of reception of the redirect request message; receiving a tracking area update response message transmitted by the third location management device, the tracking area update response message being a response to the third tracking area update request message and including at least identification information identifying the third location management device; and transmitting a tracking area update response message including at least the identification information identifying the third location management device to the terminal device in response to reception of the tracking area update response message, the tracking area update response message being a response to the first tracking area update request message.

A communication control method for a base station device according to the present invention is a communication control method for a base station device that connects to a first core network including a first location management device and a second core network including a second location management device and a third location management device. The method includes at least the steps of: receiving a first tracking area update request message including at least identification information on a terminal device and identification information on the second location management device from the terminal device, and on the basis of reception of the first tracking area update request message, transmitting a second tracking area update request message including at least the identification information on the second location management device to the first location management device; receiving a redirect request message transmitted by the first location management device; and transmitting, in the case where there is no connectivity with the second core network, a tracking area update response message including at least identification information identifying the first location management device to the terminal device in response to reception of the redirect request message, the tracking area update response message being a response to the first tracking area update request message.

A communication control method for a location management device according to the present invention is a communication control method for a first location management device deployed in a first core network and connected to a base station device. The method includes at least the steps of: receiving a first tracking area update request message including at least identification information on a terminal device and identification information on a second location management device deployed in a second core network, from the base station device; transmitting a context request message requesting a context of the terminal device to the second location management device; receiving, from the second location management device, a context response message including at least identification information indicating a redirect to a location management device deployed in the second core network that is different from the second location management device, the context response message being a response to the context request message; and transmitting, to the base station device, a redirect request message requesting a redirect to a location management device deployed in the second core network that is different from the second location management device, on the basis of reception of the context response message.

A terminal device according to the present invention is a terminal device in a communication system constituted of the terminal device, a base station device, a first core network including a first location management device, and a second core network including a second location management device. The terminal device includes a transmitter and a receiver. The transmitter transmits, to the base station device, a first tracking area update request message including at least identification information on the terminal device and identification information on the first location management device. The receiver receives, from the base station device, a tracking area update response message including at least identification information identifying the second location management device, the tracking area update response message being a response to the first tracking area update request message.

A communication control method for a terminal device according to the present invention is a communication control method for a terminal device in a communication system constituted of the terminal device, a base station device, a first core network including a first location management device, and a second core network including a second location management device. The method includes at least the steps of: transmitting, from the terminal device to the base station device, a first tracking area update request message including at least identification information on the terminal device and identification information on the first location management device; and receiving, from the base station device, a tracking area update response message including at least identification information identifying the second location management device, the tracking area update response message being a response to the first tracking area update request message.

A communication system according to the present invention is a communication system including a terminal device, a base station, a first core network including a first location management device, and a second core network including a second location management device and a third location management device. The terminal device transmits, to the base station device, a first tracking area update request message including at least identification information on the terminal device and identification information on the second location management device. The base station device receives, from the terminal device, the first tracking area update request message including at least the identification information on the terminal device and the identification information on the second location management device, and transmits a second tracking area update request message including at least the identification information on the second location management device to the first location management device on the basis of reception of the first tracking area update request message. The first location management device receives, from the base station device, the first tracking area update request message including at least the identification information on the terminal device and the identification information on the second location management device deployed in the second core network; transmits a context request message requesting a context of the terminal device to the second location management device; receives, from the second location management device, a context response message including at least identification information indicating a redirect to a location management device deployed in the second core network that is different from the second location management device, the context response message being a response to the context request message; and transmits, to the base station device, a redirect request message requesting a redirect to a location management device deployed in the second core network that is different from the second location management device, on the basis of reception of the context response message. The base station device receives the redirect request message transmitted by the first location management device; transmits a third tracking area update request message to the third location management device on the basis of reception of the redirect request message; receives a tracking area update response message transmitted by the third location management device, the tracking area update response message being a response to the third tracking area update request message and including at least identification information identifying the third location management device; and transmits a tracking area update response message including at least the identification information identifying the third location management device to the terminal device in response to reception of the tracking area update response, the tracking area update response message being a response to the first tracking area update request message. The terminal device receives, from the base station device, a tracking area update response message including at least the identification information identifying the third location management device, the tracking area update response message being a response to the first tracking area update request message.

Advantageous Effects of Invention

According to the present invention, a tracking area update procedure for registering movement of a terminal device and a location of the terminal device can be realized in a communication network constituted of overlaid core networks.

BRIEF DESCRIPTION OF DRAWINGS

FIGS. 2A and 2B are diagrams illustrating the configuration of an IP mobile communication network and the like.

FIGS. 7A and 7B are diagrams illustrating a first variation on the tracking area update procedure.

DESCRIPTION OF EMBODIMENT

Hereinafter, a preferred embodiment for carrying out the present invention will be described with reference to the drawings. Note that as an example, the present embodiment describes an embodiment of a mobile communication system to which the present invention is applied.

1. First Embodiment

Hereinafter, a radio communication technology according to an embodiment of the present invention will be described in detail with reference to the drawings.

1.1 System Overview

Figure 1:
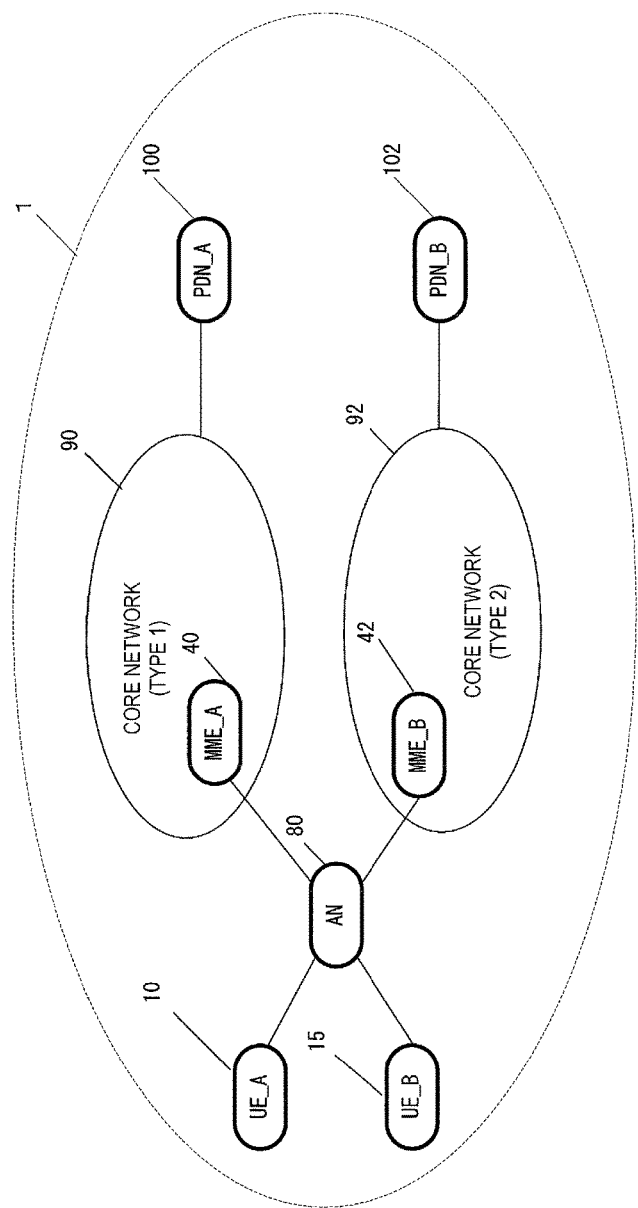
FIG. 1 is a diagram illustrating an overview of a mobile communication system.

FIG. 1 is a diagram illustrating an overview of a mobile communication system according to the present embodiment. As illustrated in FIG. 1, a mobile communication system 1 is constituted of mobile terminal devices UE_A 10 and UE_B 15, an access network 80, a core network (type 1) 90, a core network (type 2) 92, a packet data network (PDN)_A 100, and a PDN_B 102.

Here, "core network" refers to an IP mobile communication network run by a mobile operator. Note that the core network (type 1) 90 and the core network (type 2) 92 may be networks that are overlaid in the mobile communication system 1.

The core network (type 1) 90 and the core network (type 2) 92 may be core networks run and managed by a single mobile operator. Alternatively, these core networks may be core networks run and managed by respective mobile operators. For example, the core network (type 1) 90 may be a core network for the mobile operator that runs and manages the mobile communication system 1, whereas the core network (type 2) 92 may be a core network for a virtual mobile operator such as a mobile virtual network operator (MVNO). Thus, the core network (type 2) 92 may be configured as a virtual mobile operator network. Here, "type", such as type 1 and type 2, refers to information identifying a core network. The information identifying a core network is not limited to "type" and may be any information capable of identifying a core network. With identification numbers assigned to each core network, the multiple overlaid core networks may be identified by those identification numbers, such as "core network 1" and "core network 2". Alternatively, in the case where multiple mobile network operators including an MVNO have respective core networks, the core networks may be identified by information identifying the mobile operators.

Furthermore, the UE_A 10 and the UE_B 15 may have a core network type assigned thereto in advance. It is assumed here that the type 1 is assigned to the UE_A 10 and the type 2 is assigned to the UE_B 15.

There may also be a UE to which a core network type has been assigned and a UE to which a core network type has not been assigned. The UE to which a core network type has not been assigned may connect to a default core network. Which core network serves as the default core network may be managed by the mobile operator or the like in advance, and the default network may be determined on the basis of such management information. For example, a PDN connection may be established with the core network (type 1) 90, which is a main core network, serving as the default network. On the other hand, the UE to which a core network type has been assigned may connect to a dedicated core network corresponding to the specified type and establish a PDN connection.

Furthermore, such a type may be set to each UE before terminal shipment. Additionally, multiple types may be set before shipment, and a user or the UE itself may then change the type in accordance with the purpose of communication.

The core network (type 1) 90 is a dedicated core network for UEs assigned with the type 1 and includes a mobility management entity (MME)_A 40.

Likewise, the core network (type 2) 92 is a dedicated core network for UEs assigned with the type 2 and includes an MME_B 42.

Furthermore, as illustrated in FIG. 1, the core network (type 1) 90 and the core network (type 2) 92 can connect to respective packet data networks (PDNs).

The PDN_A 100 and the PDN_B 102 are packet data networks, outside the core networks, corresponding to the purposes of the UEs. For example, in the case where the core network (type 1) 90 is the main core network, the PDN_A 100 may be an IP multimedia subsystem (IMS) or the like. Furthermore, in the case where the core network (type 2) 92 is a dedicated core network for M2M terminals, the PDN_B 102 may be an M2M service network.

Next, an example of the configuration of the core network (type 1) 90 will be described using FIGS. 2A and 2B. Note that the configuration of the core network (type 2) 92 is the same as the configuration of the core network (type 1) 90, and thus detailed descriptions thereof will be omitted.

Figure 2A:
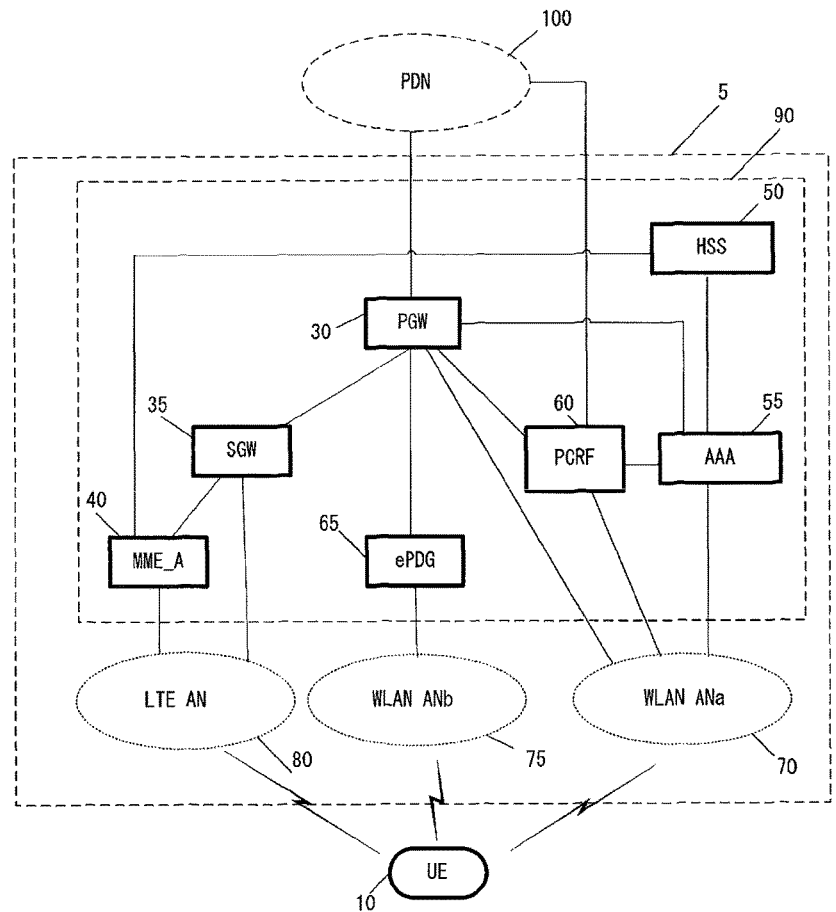

As illustrated in FIG. 2A, the core network (type 1) 90 is constituted of a home subscriber server (HSS) 50, an authentication, authorizing, accounting (AAA) 55, a policy and charging rules function (PCRF) 60, a packet data network gateway (PGW) 30, an enhanced packet data gateway (ePDG) 65, a serving gateway (SGW) 35, and the MME_A 40.

Additionally, access networks (an LTE AN 80, a WLAN ANb 75, and a WLAN ANa 70) are connected to the core network (type 1) 90.

A radio access network may be constituted of multiple different access networks. Each access network is connected to the core network (type 1) 90. Furthermore, a UE 10 can wirelessly connect to the radio access network.

Furthermore, the WLAN access network b (WLAN ANb 75) that connects to the ePDG 65 that serves as the device for connecting to the core network (type 1) 90 and the WLAN access network a (WLAN ANa 75) that connects to the PGW 30, the PCRF 60, and the AAA 55 can be configured as the access networks that can connect in a WLAN access system.

Note that each device has the same configuration as the conventional devices in a mobile communication system using EPS, and thus detailed descriptions will be omitted. Each device will be described briefly hereinafter.

The PGW 30 is connected to a PDN 100, the SGW 35, the ePDG 65, the WLAN ANa 70, the PCRF 60, and the AAA 55 and delivers user data by functioning as a gateway device between the PDN 9 and the core network (type 1) 90.

The SGW 35 is connected to the PGW 30, the MME_A 40, and the LTE AN 80 and delivers user data by functioning as a gateway device between the core network (type 1) 90 and the LTE AN 80.

The MME_A 40 is connected to the SGW 35, the LTE AN 80, and the HSS 50 and is an access control device that carries out location information management and access control for the UE 15 via the LTE AN 80. The core network (type 1) 90 may be configured including multiple location management devices. For example, an MME_C 44 may be configured as a different location management device from the MME_A 40. Like the MME_A 40, the MME_C 44 may be connected to the SGW 35, the LTE AN 80, and the HSS 50.

Additionally, the MME_C 44 and the MME_A 40 may be connected to each other. Through this, the MME_C 44 and the MME_A 40 may transmit and receive contexts of the UE 10.

The HSS 50 is connected to the MME_A 40 and AAA 55 and is a managing node that manages subscriber information. The subscriber information of the HSS 50 is referred to during MME_A 40 access control, for example.

The HSS 50 may be further connected to the MME_B 42. As illustrated in FIG. 1, the MME_B 42 is included in an overlay network on the core network (type 1) 90, namely the core network (type 2) 92.

In other words, the HSS 50 may be connected to an MME, such as the MME_B 42, included in a core network different from the core network in which the HSS 50 is included. Furthermore, the subscriber information in the HSS 50 is also referred to during MME_B 42 access control.

Additionally, the HSS 50 may be included in the core network (type 2) 92. In this case, the HSS 50 may be connected to the MME_A 40.

In other words, multiple overlaid core networks may share a single HSS.

The AAA 55 is connected to the PGW 30, the HSS 50, the PCRF 60, and the WLAN ANa 70 and carries out access control for the UE 10 connected via the WLAN ANa 70.

The PCRF 60 is connected to the PGW 30, the WLAN ANa 75, the AAA 55, and the PDN 100 and manages QoS for data delivery. For example, the PCRF 60 manages QoS of a communication path between the UE_A 10 and the PDN_A 100.

The ePDG 65 is connected to the PGW 30 and the WLAN ANb 75 and delivers user data by functioning as a gateway device between the core network (type 1) 90 and the WLAN ANb 75.

Figure 2B:
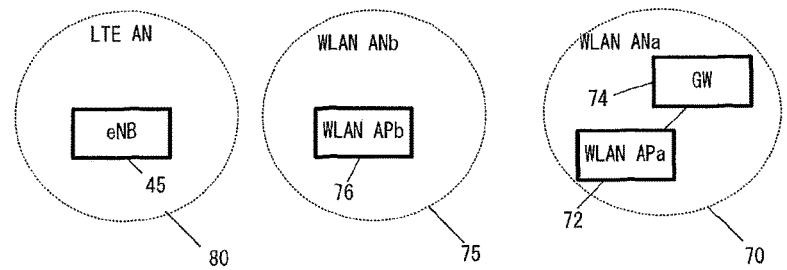

Meanwhile, as illustrated in FIG. 2B, each radio access network includes devices to which the UE_A 10 is actually connected (such as a base station device and an access point device), and the like. The devices used in these connections can be thought of as devices adapted to the radio access networks.

In the present embodiment, the LTE AN 80 is configured including an eNB 45. The eNB 45 is a radio base station to which the UE 10 connects in an LTE access system, and the LTE AN 80 may be configured including one or multiple radio base stations.

The WLAN ANa 70 is configured including a WLAN APa 72 and a gateway (GW) 74. The WLAN APa 72 is a radio base station to which the UE 10 connects in a WLAN access system trusted by the operator running the core network (type 1) 90, and the WLAN ANa 70 may be configured including one or multiple radio base stations. The GW 74 is a gateway device between the core network (type 1) 90 and the WLAN ANa 70. The WLAN APa 72 and the GW 74 may be constituted as a single device.

In the case where the operator who runs the core network (type 1) 90 and the operator who runs the WLAN ANa 70 are different, implementation using this configuration is possible through contracts, agreements, and the like between the operators.

Additionally, the WLAN ANb 75 is configured including a WLAN APb 76. The WLAN APb 76 is a radio base station to which the UE 10 connects in a WLAN access system in the case where no trusting relationship is established with the operator running the core network (type 1) 90, and the WLAN ANb 75 may be configured including one or multiple radio base stations.

In this manner, the WLAN ANb 75 is connected to the core network (type 1) 90 via the ePDG 65, which is a device included in the core network (type 1) 90, serving as a gateway. The ePDG 65 has a security function for ensuring security.

Note that in the present specification, the UE 10 being connected to each radio access network refers to the UE 10 being connected to a base station device, an access point, or the like included in each radio access network, and data, signals, and the like being transmitted and received also traverse those base station devices, access points, or the like.

1.2. Device Configuration

Next, the configuration of each device will be described briefly using the drawings.

1.2.1. eNB Block Diagram

Figures 3A, 3B, 3C:
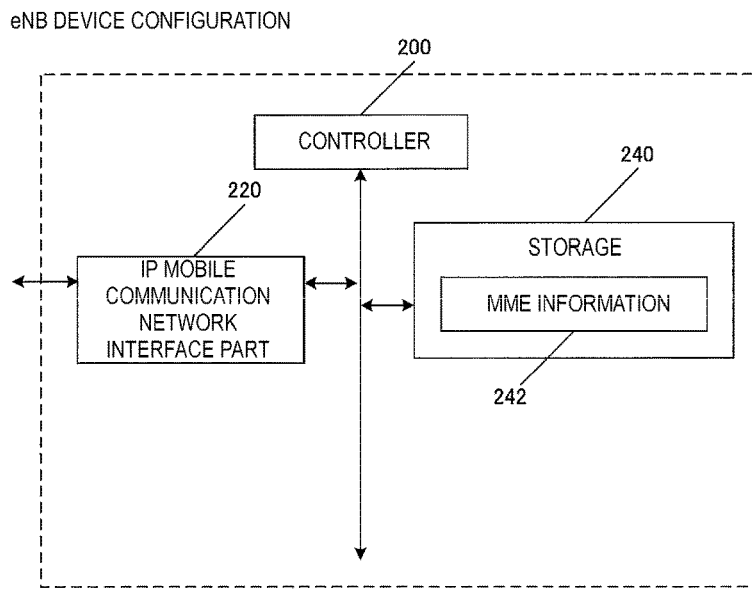
FIGS. 3A to 3C are diagrams illustrating the functional configuration of an eNB.

FIG. 3A is a block diagram illustrating the eNB 45. As illustrated in FIG. 3A, the eNB 45 is constituted of an IP mobile communication network interface part 220, a controller 200, and a storage 240. The IP mobile communication network interface part 220 and the storage 240 are connected to the controller 200 via a bus.

The controller 200 is a function part for controlling the eNB 45. The controller 200 implements various processes by reading out and executing various programs stored in the storage 240.

The IP mobile communication network interface part 220 is a function part for connecting the eNB 45 to the UE_A 10 and UE_B 15, and to the core network (type 1) 90 and the core network (type 2) 92.

The storage 240 stores MME information 242. MMEs that can be connected from the eNB 45 are stored in the MME information 242. For example, as illustrated in FIG. 3B, identification information on MMEs connectable from the eNB 45 and area information identifying the service areas of the MMEs may be stored in association with each other. The example in FIG. 3B indicates that a different MME is stored for each service area, and the base station device deployed for each service area can connect to the MME associated with that service area. Note that MMEs included in different types of core networks may be stored for the same service area. For example, an MME belonging to a type 1 core network and an MME belonging to a type 2 core network may be associated with a service area "A".

Here, the MME identification information may be any information capable of identifying MMEs and may be a globally unique MME identifier (GUMMEI), for example. The GUMMEI is MME identification information and includes a public land mobile network (PLMN), which is identification information on the mobile operator network, an MME group number identifying multiple MMEs, and an MME number identifying an individual MME.

Note that the MME group number may be stored including information capable of identifying the type of core network. In this case, the core network can be identified by the MME group number. Furthermore, MMEs belonging to the corresponding core network may be managed as a group, in association with the MME group number. Thus, the type of core network in which the MMEs are included may be identified on the basis of the MME identification information and the MME group number.

Alternatively, type information on the core network may be expressed by an information element independent from the MME identification information. For example, as illustrated in FIG. 3C, the MME information 242 may be stored in which type information, which is core network identification information, area information, and MME identification information are associated with each other. This makes it possible to configure areas in accordance with the core network type. Furthermore, the MMEs deployed for each area can be stored as well. Further still, MMEs can be stored for each type of core network. An MME deployed for a specific area of a specific core network can furthermore be stored.

Note that the MME identification information may be the GUMMEI, as mentioned earlier.

In these methods for managing the MME identification information, it is not absolutely necessary to store the area information, and the core network type and MME identification information may be stored in association with each other.

Note that the area information described thus far may also be tracking area information or routing area information.

1.2.2. MME Block Diagram

Next, the configuration of the MME_A 40 will be described. Note that the MME_B 42 has the same configuration and thus detailed descriptions thereof will be omitted.

Figures 4A, 4B, 4C:
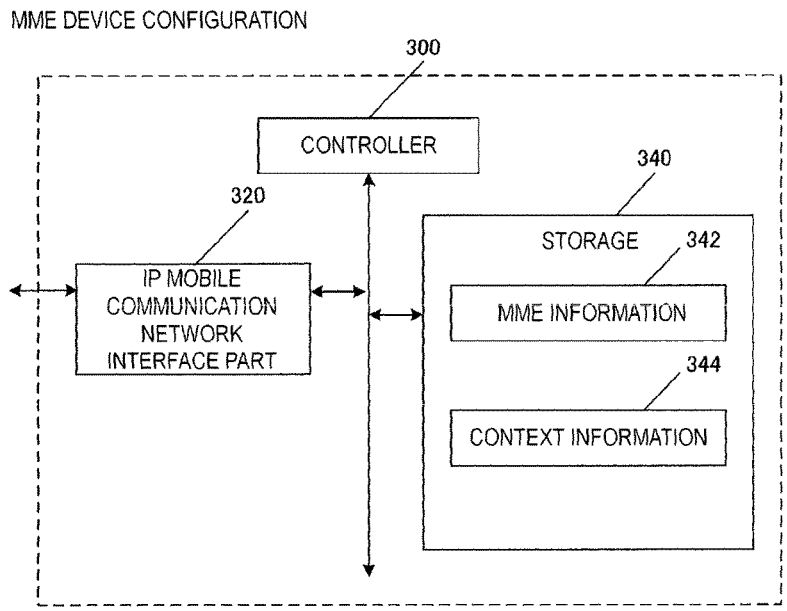
FIGS. 4A to 4C are diagrams illustrating the functional configuration of an MME.

FIG. 4A is a block diagram illustrating the MME_A 40. As illustrated in FIG. 4A, the MME_A 40 is constituted of an IP mobile communication network interface part 320, a controller 300, and a storage 340. The IP mobile communication network interface part 320 and the storage 340 are connected to the controller 300 via a bus.

The controller 300 is a function part for controlling the MME_A 40. The controller 300 implements various processes by reading out and executing various programs stored in the storage 340.

The IP mobile communication network interface part 320 is a function part through which the MME_A 40 connects to the eNB 45, the SGW 35, the HSS 50, and the like.

As illustrated in FIG. 4A, the storage 340 stores MME information 342 and context information 344.

As illustrated in FIG. 4B, the MME information 342 may be stored in which MME identification information, MME service area information, and core network identification information are associated with each other.

Here, the MME identification information may be any information capable of identifying the MME, and thus may be a globally unique MME identifier (GUMMEI), for example. The GUMMEI is MME identification information, and includes a public land mobile network (PLMN), which is identification information on the mobile operator network, an MME group number identifying multiple MMEs, and an MME number identifying an individual MME.

Note that the MME group number may be stored including information capable of identifying the type of core network. In this case, the core network can be identified by the MME group number. Furthermore, MMEs belonging to the corresponding core network may be managed as a group, in association with the MME group number. Thus, the type of core network in which the MMEs are included may be identified on the basis of the MME identification information and the MME group number.

In this case, the MME identification information and the service area information may be stored in association with each other as MME information 342, and it is not absolutely necessary to store the core network type information.

In these methods for managing the MME identification information, it is not absolutely necessary to store the area information, and the core network type and MME identification information may be stored in association with each other.

Note that the area information described thus far may also be tracking area information or routing area information.

As illustrated in FIG. 4C, information pertaining to UEs stored in the MME, on a UE-by-UE basis, is stored as the context information 344. The UE context information may be a mobility management (MM) context, which an MME conventionally stored, an evolved packet system (EPS) bearer context, or both.

Note that it may be determined that the core networks be divided for the purpose of operation and management by the mobile operators, and the information identifying the core networks, such as type information, may be identification information assigned on the basis of this determination.

Alternatively, the information identifying the core networks, such as type information, may be information associated with the communication terminal type, attributes, or the like. For example, the information may be identification information identifying the core network to which an M2M terminal connects, identification information identifying the core network to which a normal call terminal such as a smartphone connects, or the like.

Alternatively, the information identifying the core networks, such as type information, may be identification information associated with a service provided by the mobile operator. For example, information identifying a specific service provided to an M2M terminal and identification information for providing a voice call service such as IMS may be associated with information identifying a core network. In this case, the core networks can be configured so as to be separated by service. Note that managing the terminals to which services are provided on the basis of the services makes it possible to divide the core networks to which terminals connect on the basis of the terminals to which each service is provided.

1.3. Description of Processing

A tracking area update procedure involved in MME relocation will be described next. Conventionally, a UE carries out the tracking area update procedure in order to register its location with a core network. The tracking area update procedure is a procedure initiated by the UE. Triggers for the UE to start the tracking area update procedure include carrying out the procedure periodically every set amount of time, and multiple such conditions are defined in the 3GPP specifications. The tracking area update procedure is also executed for the purpose of enabling a core network to manage the location of the UE_A 10 and the like, even when the UE_A 10 has transited to an idle mode and moved in a state where radio resources and the like are released.

Furthermore, there are cases where it is necessary to change the MME in the tracking area update procedure, and a tracking area update procedure involved in MME relocation is also defined for such cases. For example, it is necessary to change the MME in the case where the UE has moved significantly from a previously-registered location, the case where the tracking area where the UE registered its location the previous time differs from the tracking area where the UE newly registers its location, and the like.

Unlike the conventional procedure, the tracking area update procedure involved in MME relocation in the present embodiment carries out location registration that enables movement while maintaining the core network type. This procedure makes it possible for a UE to maintain a connection to the same overlaid network. To rephrase, the UE can maintain a connection to a core network identified by the same core network identification information (type information, for example).

1.3.1. Tracking Area Update Procedure Involved in MME Relocation

Figure 5:
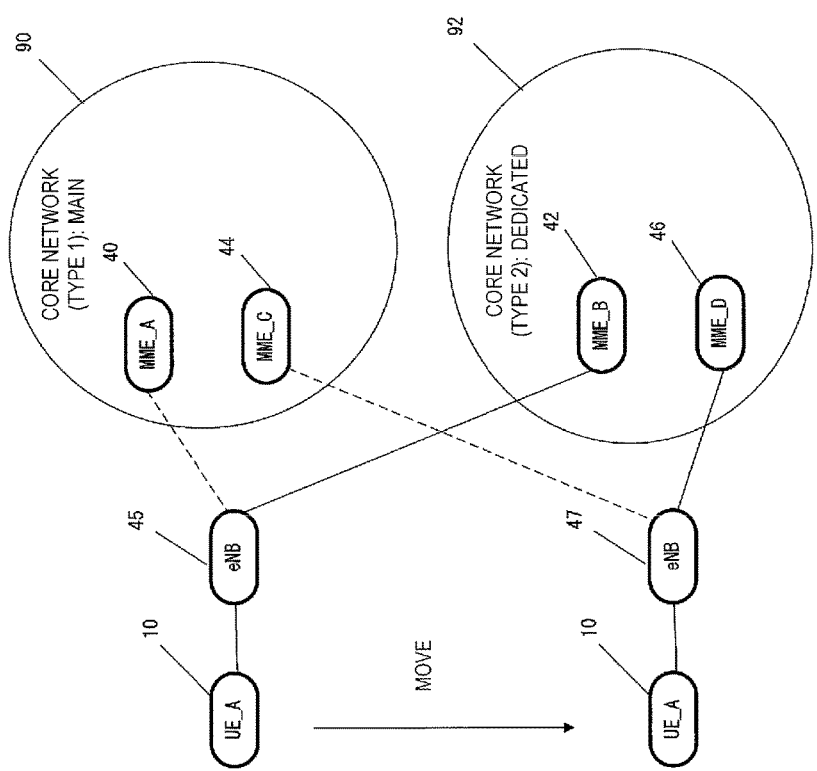
FIG. 5 is a diagram illustrating a system model.

FIG. 5 is a diagram illustrating a system model for the purpose of describing the tracking area update procedure. As illustrated in FIG. 5, the system model is constituted of the eNB 45, an eNB 47, the core network (type 1) 90, and the core network (type 2) 92.

The eNB 45 is an LTE base station to which the UE_A 10 is connected before moving. On the other hand, the eNB 47 is an LTE base station to which the UE_A 10 is connected after moving. Aside from an access region, the eNB 47 is the same as the eNB 45, and thus detailed descriptions of the configuration thereof will be omitted.

The core network (type 1) 90 is the main core network, and has connectivity with the eNB 45 and the eNB 47. Note that the "main core network" referred to here may be a core network with which UEs that do not particularly require a dedicated core network establish a PDN connection.

Alternatively, in the case where the core network type of a UE connected to the eNB 45 or the eNB 47 is not known, the core network (type 1) 90 may be used as a core network for making a temporary connection.

The MME_A 40 and the MME C 44 are included in the core network (type 1) 90. The MME_A 40 has connectivity with the eNB 45, and the MME_C 44 has connectivity with the eNB 47. The MME_C 44 has the same configuration as the MME_A 40, and thus detailed descriptions of the functional configuration thereof will be omitted.

Meanwhile, the core network (type 2) 92 is a dedicated core network for UEs whose core network type is type 2, and has connectivity with the eNB 45 and the eNB 47.

The MME_B 42 and an MME_D 46 are included in the core network (type 2) 92. The MME_B 42 has connectivity with the eNB 45, and the MME_D 46 has connectivity with the eNB 47. The MME_D 46 has the same configuration as the MME_B 44, and thus detailed descriptions of the functional configuration thereof will be omitted.

Next, an MME relocation method involved in a tracking area update procedure started from the UE_A 10 will be described using FIG. 6.

Figure 6:
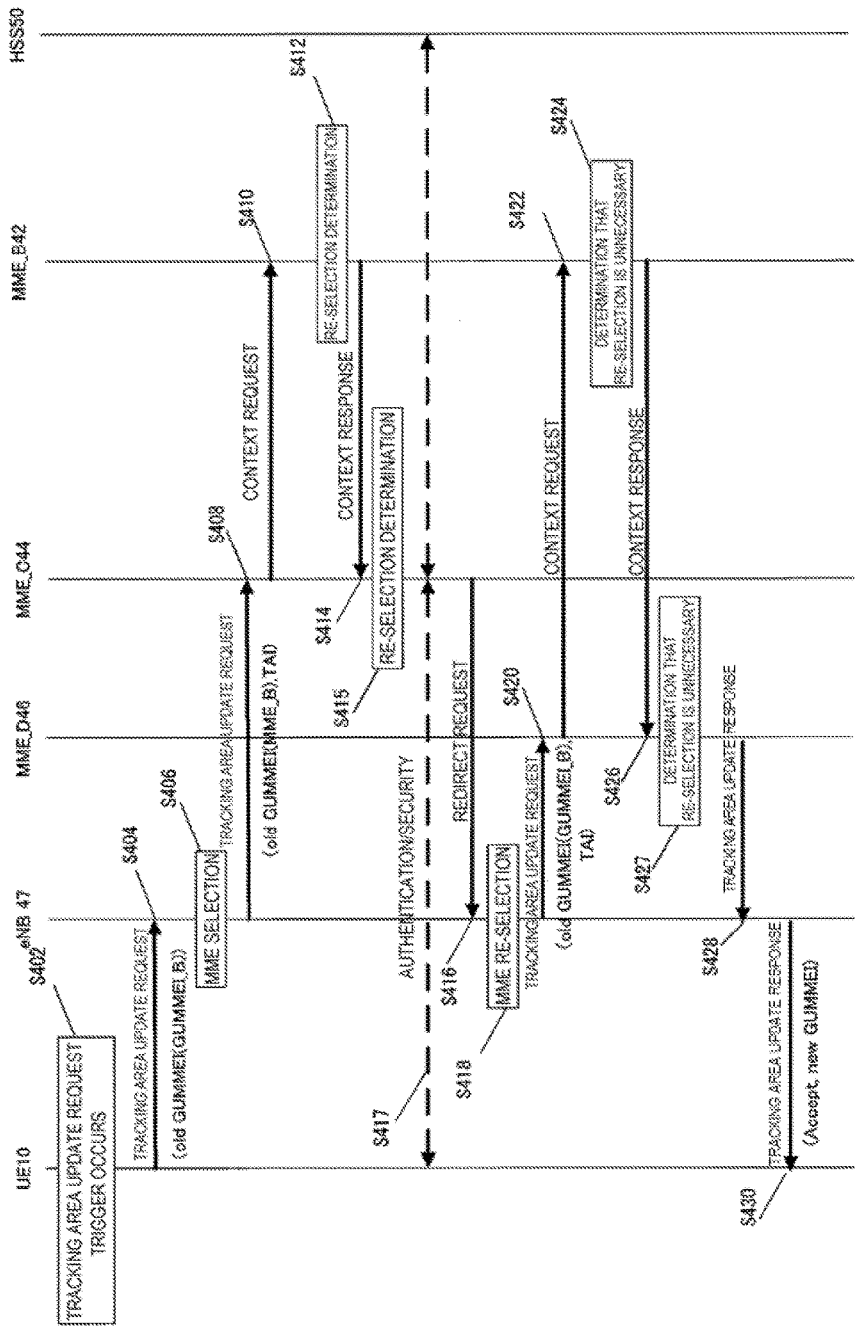
FIG. 6 is a diagram illustrating a tracking area update procedure.

Note that in the descriptions referencing FIG. 6, it is assumed that the eNB 45 stores the MME_A 40 in association with the core network type 1 in the MME information 242. Furthermore, it is assumed that the eNB 45 stores the MME_B 42 in association with the core network type 2.

Note that the eNB 45 stores that a default MME is the MME_A 40. "Default MME" refers to an MME selected as a connection destination by the eNB 45 in the case where there are no special conditions. Additionally, the eNB 45 may store a default core network type (type 1) without storing the information on a specific MME, such as the MME_A 40, as the default MME. In the case where there are no specific conditions, the eNB 45 may select, as the default MME, the MME stored in association with the default core network type (type 1) (that is, the MME_A 40).

Additionally, it is assumed that the eNB 47 stores the MME_C 44 in association with the core network type 1 in the MME information 242. Furthermore, it is assumed that the eNB 47 stores the MME_D 46 in association with the core network type 2.

Note that the eNB 47 stores that a default MME is the MME_C 44. "Default MME" refers to an MME selected as a connection destination by the eNB 47 in the case where there are no special conditions. Additionally, the eNB 47 may store a default core network type (type 1) without storing the information on a specific MME, such as the MME_B 42, as the default MME. In the case where there are no specific conditions, the eNB 47 may select, as the default MME, the MME stored in association with the default core network type (type 1) (that is, the MME_C 44).

Note that this example describes a case where information identifying the core network type is not included in the MME identification information. To be more specific, this example describes a case where the eNB 47 stores the MME information 242 such as that illustrated in FIG. 3B in the storage 240, and information capable of identifying a core network type is not stored in a group information part of the GUMMEI as the MME identification information.

In other words, in FIG. 6, it is assumed that the eNB 45 and the eNB 47 do not have functions for identifying the type of core network to which the MME is connected on the basis of the MME identification information.

In the example illustrated in FIG. 6, the UE_A 10 is a UE whose core network type is type 2, and in an initial state, the UE_A 10 is connected to the core network (type 2) 92 via the eNB 45. At that time, the MME_B 42 manages the location of the UE_A 10.

A trigger for transmitting a tracking area update request occurs in the UE_A 10 (S402). The trigger for transmitting the tracking area update request is not particularly limited, and the same trigger as a conventional trigger may be used, such as the trigger occurring periodically when a timer expires. At this time, it is assumed that the UE_A 10 is moving in a connection region of the eNB 47.

On the basis of the tracking area update request trigger, the UE_A 10 transmits a tracking area update request message to the eNB 47 (S404).

The UE_A 10 may transmit the message including the identification information on the UE_A 10, the identification information on the MME_B 42 to which the UE_A 10 is connected before moving, and the tracking area information indicating the location of the UE_A 10. Through this, the UE_A 10 requests the eNB 47 to update the tracking area information on the UE_A 10 managed by the MME. Note that the identification information on the UE_A 10 may employ a globally unique temporary Identity (GUTI) assigned globally and uniquely to the UE_A 10. The identification information on the MME_B 42 may employ a GUMMEI. Additionally, the GUMMEI may be configured to be included in the GUTI.

In the following, the GUMMEI identifying the MME to which the UE is connected before moving is denoted as "old GUMMEI". Note that the UE_A 10 may obtain and store the old GUMMEI from the core network when the UE_A 10 has attached, when a PDN connection has been established, as a result of the previous tracking area update procedure, or the like.

The eNB 47 receives the tracking area update request message from the UE_A 10. The eNB 47 obtains the UE identification information, the pre-movement MME identification information such as the old GUMMEI, and the tracking area information, each included in the message.

Next, the eNB 47 executes an MME selection process on the basis of reception of the tracking area update request message (S406).

In the case where the eNB 47 has connectivity with the old GUMMEI, the eNB 47 may select the MME corresponding to the old GUMMEI and connect thereto. On the other hand, in the case where the eNB 47 does not have connectivity with the MME_B 42 identified by the old GUMMEI or an MME is not stored in the storage as in the present embodiment, the eNB 47 selects an MME for temporal connection.

Although the method for selecting the MME is not particularly limited, the default MME may be selected. Here, the MME_C 44, which is the default MME, is selected.

Next, the eNB 47 transmits the tracking area update request message to the MME_C 44 on the basis of the MME selection process (S408).

The eNB 47 may transmit the message including the identification information on the UE_A 10, the identification information on the MME_B 42 to which the UE_A 10 is connected before moving, and the tracking area information indicating the location of the UE_A 10.

Through this, the eNB 47 may request the MME_C 44 to receive and store the context of the UE_A 10 from the MME to which the UE_A 10 is connected before moving, and to update the tracking area of the UE_A 10 included in the context of the UE_A 10.

The MME_C 44 receives the tracking area update request message from the eNB 47. The MME_C 44 obtains the identification information on the MME_B 42 to which the UE_A 10 is connected before moving (the old GUMMEI, for example) included in the message. The MME_C 44 transmits a context request message to the MME_B 42 on the basis of the old GUMMEI (S410). Through this, the MME_C 44 requests the MME_B 42 to transmit the context of the UE_A 10.

The message includes the tracking area update request message received from the eNB 47. Furthermore, the MME_C 44 may transmit the message including the identification information on the core network to which the MME_C 44 connects. Specifically, the MME_C 44 may transmit the message including the type information (type 1) of the core network to which the MME_C 44 connects.

The MME_B 42 receives the context request message from the MME_C 44. Through this, the MME_B 42 obtains the identification information on the core network of the MME_C 44 included in the message.

On the basis of obtaining the core network identification information, the MME_B 42 executes an MME re-selection determination process (S412).

In the MME re-selection determination process, the MME_B 42 may determine whether or not to carry out re-selection on the basis of a comparison between the obtained core network identification information and the identification information on the core network to which the MME_B 42 connects. Note that prior to the MME re-selection determination process, the MME_B 42 may store the identification information on the core network to which the MME_B 42 connects in advance. More specifically, the MME_B 42 may store the type information (type 2) on the core network to which the MME_B 42 connects in advance.

Furthermore, as a more specific example of the MME re-selection determination process, the MME_B 42 may determine to not carry out the MME re-selection in the case where the obtained core network identification information and the identification information on the core network to which the MME_B 42 connects indicate the same core network.

Additionally, the MME_B 42 may determine to carry out the MME re-selection in the case where the obtained core network identification information and the identification information on the core network to which the MME_B 42 connects indicate different core networks.

In the example described in the present embodiment, the obtained core network identification information is type information indicating type 1, whereas the identification information on the core network to which the MME_B 42 connects is type information indicating type 2. As such, the MME_B 42 determines to carry out the MME re-selection.

The MME_B 42 transmits a context response message to the MME_C 44 as a response to the received context request (S414).

In the case of the MME re-selection on the basis of the MME re-selection determination process, the MME_B 42 may include an information element indicating that the response is a rejection of the context request and identification information indicating a request to execute a redirect to another MME. Note that in this case, the MME_B 42 may transmit the message without including the context of the UE_A 10.

Here, "redirect" may mean an MME re-selection, transmitting a tracking area update request message to a new MME, or both.

Additionally, the MME_B 42 may transmit the message including information identifying an MME redirected by the eNB 47. In this manner, the MME that is the redirect destination may be specified by the MME_B 42 including the identification information on the specified MME in the message.

Here, the identification information indicating a request to execute a redirect to another MME may employ a flag such as "flag1", or may employ information identifying the MME that is the redirect destination.

Additionally, the MME_B 42 may transmit the identification information on the core network to which the MME_B 42 connects, such as the type information, as the identification information indicating the request to execute a redirect to another MME.

Note that the MME_B 42 may transmit a redirect request message, specific control information such as a context response rejection, or the like as a context response message when requesting the redirect to be executed. Additionally, in the case where the MME_B 42 transmits a rejection response message for the context response, the MME_B 42 may transmit the message including cause information, such as a Cause Value, indicating that a redirect is necessary.

Meanwhile, in the case where the MME re-selection is not carried out on the basis of the MME re-selection determination process, the MME_B 42 may transmit a context response to the MME_C 44 on the basis of reception of the context request message (S414).

At this time, the MME_B 42 may transmit the message including the context of the UE_A 10, the identification information on the core network type of the MME_B 42, and identification information identifying the MME_B 42 such as a GUMMEI.

The MME_C 44 receives the context response message from the MME_B 42.

Furthermore, the MME_C 44 detects whether or not a redirect is necessary on the basis of the received context response message. The MME_C 44 may detect that a redirect is necessary in response to identification information indicating a request to execute a redirect being included in the context response message, the context response message being a redirect request message, the context response message being a rejection response message for the context response, cause information such as a Cause Value included in the message indicating that a redirect is necessary, or the like.

Alternatively, the MME_C 44 may detect that a redirect is not necessary when such information is not present, and the MME_C 44 may detect that a redirect is not necessary in response to the context of the UE_A 10 being received.

In the procedure described above, the MME_B 42 executes the re-selection determination process (S412), and determines whether or not a redirect is necessary, but the MME_C 44 may carry out the re-selection determination process instead of the MME_B 42 carrying out the re-selection determination process.

In this case, the MME_C 44 may transmit the context request (S410) to the MME_B 42 without including the identification information on the core network to which the MME_C 44 connects.

Furthermore, the MME_B 42 may transmit the context response to the MME_C 44 (S414) on the basis of reception of the context request message, without carrying out the re-selection determination process (S412).

At this time, the MME_B 42 may transmit the message including the context of the UE_A 10, the identification information on the core network type of the MME_B 42, and identification information identifying the MME_B 42 such as a GUMMEI.

Furthermore, the MME_B 42 may hold the context information on the UE_A 10 rather than immediately deleting that information. Note that the context information on the UE_A 10 may be deleted after a pre-set amount of time has passed following the transmitting of the context response. In this manner, the MME_B 42 may continue to hold the context information on the UE_A 10 without being deleted so as to respond to a context request that has been made again.

The MME_C 44 receives the context response and executes the MME re-selection determination process (S415).

In the MME re-selection determination process, the MME_C 44 may determine whether or not to carry out re-selection on the basis of a comparison between the core network identification information obtained from the context response and the identification information on the core network to which the MME_C 44 connects. Note that prior to the MME re-selection determination process, the MME_C 44 may store the identification information on the core network to which the MME_C 44 connects in advance. More specifically, the MME_C 44 may store the type information (type 1) on the core network to which the MME_C 44 connects in advance.

Furthermore, as a more specific example of the MME re-selection determination process, the MME_C 44 may determine to not carry out the MME re-selection in the case where the obtained core network identification information and the identification information on the core network to which the MME_B 42 connects indicate the same core network.

Additionally, the MME_C 44 may determine to carry out the MME re-selection in the case where the obtained core network identification information and the identification information on the core network to which the MME_C 44 connects indicate different core networks.

In the example described in the present embodiment, the obtained core network identification information is type information indicating type 2, whereas the identification information on the core network to which the MME_C 44 connects is type information indicating type 1. As such, the MME_C 44 determines to carry out the MME re-selection.

In this manner, the MME_C 44 may detect whether or not a redirect is necessary on the basis of the re-selection determination process.

Note that in the conventional tracking area update procedure, an MME that has received an update procedure rejection response from a pre-movement MME executes a procedure for authentication and establishing security by transmitting and receiving control information including a UE and HSS. However, in the case where the MME_C 44 has detected that a redirect is necessary, the authentication and security processes may be omitted rather than being executed (S417) as in the present embodiment.

To be more specific, the MME_C 44 may not obtain the identification information on the core network to which the UE_A 10 connects and the subscriber information such as terminal attribute information for specifying the identification information on the core network from the HSS 60 or the like.

Note that in the case where the MME_C 44 has detected that a redirect is unnecessary, the MME_C 44 may transmit a tracking area update response message including a GUMMEI identifying a new MME to the eNB 47 on the basis of the conventional tracking area update procedure, without transmitting a redirect requests.

Furthermore, the eNB 47 that has received the tracking area update response message transmits the tracking area update response including the GUMMEI identifying the new MME to the UE_A 10 and completes the tracking area update procedure.

Next, in the case where the MME_C 44 has detected that a redirect is necessary, the MME_C 44 transmits the redirect request message to the eNB 47 (S416). The MME_C 44 may transmit the message including an information element indicating a request to redirect to another MME, or may transmit the message including specific control information indicating a request for a redirect.

Furthermore, in the case where the MME_C 44 receives from the MME_B 42 the message including MME identification information specifying the MME that is the redirect destination, the MME_C 44 may include the identification information on the specified MME in the message. Alternatively, the MME_C 44 may further transmit the redirect request message including the specified MME identification information.

Meanwhile, in the case where the MME_C 44 receives from the MME_B 42 the message that does not include the identification information on the MME that is the redirect destination, the MME_C 44 may, on the basis of the identification information on the core network to which the MME_B 42 connects included in the message received from the MME_B 42, select the MME that is the redirect destination of the eNB 47 from the MME information included in the storage, and include the identification information on the selected MME in the redirect request message.

Additionally, the MME_C 44 may transmit the message including the identification information on the core network to which the MME_B 42 connects, rather than including the MME identification information. Alternatively, the MME_C 44 may further transmit the redirect request message including the identification information on the core network to which the MME_B 42 connects.

The eNB 47 receives the redirect request message from the MME_C 44 as a response to the tracking area update request message. The eNB 47 executes the MME re-selection process on the basis of the information element indicating the request to redirect to another MME included in the message (S418).

In the MME re-selection process, in the case where the eNB 47 receives from the MME_C 44 the message including the identification information on the specified MME that is the redirect destination, the eNB 47 selects the MME included in the message as the MME that is the redirect destination.

Alternatively, in the case where the eNB 47 receives from the MME_C 44 the message including the identification information on the core network for the specified redirect destination, the eNB 47 may select the MME on the basis of the received core network identification information. For example, the eNB 47 may store core network identification information and MMEs in association with each other in advance, and select the MME corresponding to the received core network identification information.

The eNB 47 selects the MME_D 46 as a new MME on the basis of the MME re-selection process and transmits the tracking area update request message to the MME_D 46 (S420).

The message includes identification information on the MME to which the UE_A 10 was connected before the UE_A 10 moved (the old GUMMEI (GUMMEI_B)) and the tracking area information indicating the location of the UE_A 10.

Here, the identification information on the pre-move MME is the GUMMEI of the MME_B 42. The tracking area identification information is location registration area information on the UE.

Note that the eNB 47 may transmit the tracking area update request message to the MME_D 46 in response to reception of the redirect request message. Additionally, the eNB 47 may transmit the tracking area update request message to the MME_D 46 in response to an MME being successfully selected through the MME re-selection process. Furthermore, the eNB 47 may transmit the tracking area update request message to the MME_D 46 as a result of storing the identification information on an MME configured so as to be included in a core network corresponding to the identification information on the core network that is the redirect destination. Additionally, the eNB 47 may transmit the tracking area update request message to the MME_D 46 as a result of storing the identification information on the core network that is the redirect destination. Alternatively, the eNB 47 may transmit the tracking area update request message to the MME_D 46 on the basis of a combination of two or more of the above-described conditions.

The MME_D 46 receives the tracking area update request from the eNB 47. The MME_D 46 transmits the context request message to the MME_B 42 on the basis of the MME identification information included in the message (S422).

The message includes the tracking area update request message received from the eNB 47. Identification information on the core network type of the MME_D 46 may be included as well.

The MME_B 42 receives the context request message from the MME_D 46. The MMEB 42 obtains the identification information on the core network type of the MME_D 46 included in the message, compares the obtained core network type with the core network type of the MME_B 42, and determines that MME re-selection is unnecessary (S424).

The MME_B 42 transmits the context response message to the MME_D 46 on the basis of the determination that re-selection is unnecessary (S426).

The message includes an MM context, an EPS bearer context, and the like, which are contexts of the UE_A 10 stored in the storage of the MME_B 42.

Meanwhile, in the case where the MME_B42 receives from the MME_D 46 the context request message that does not include the identification information on the core network type of the MME_D 46, the MME_B 42 may transmit the context response to the MME_D 46 on the basis of reception of the message (S426).

The message includes the context of the UE_A 10 and the identification information on the core network type of the MME_B 42. The context of the UE_A 10 may include the conventional MM context, EPS bearer context, and the like. The MME_D 46 receives the context response message from the MME_B 42 as a response to the context request message.

At this time, in the case where the MME_D 46 receives the message including the context of the UE_A 10 and the identification information on the core network type of the MME_B 42, the MME_D 46 obtains the core network type of the MME_B 42 and compares the obtained core network type of the MME_B 42 with the core network type of the MME_D 46. The MME_D 46 determines that re-selection is unnecessary as a result of the comparison (S427).

The MME_D 46 stores the context of the UE_A 10 included in the message in the storage on the basis of the reception of the context or the determination that re-selection is unnecessary. Furthermore, the MME_D 46 updates tracking area information included in the context using tracking area information (a tracking area ID, for example) indicating the location of the UE_A 10 before moving, which is included in the tracking area update request message received from the eNB 47.

The MME_D 46 transmits the tracking area update response message to the eNB 47 on the basis of the reception of the context response message (S428). The message includes an information element informing that the update of the tracking area is complete and identification information on the MME_D 46 (the GUMMEI, for example) that is the new MME.

The eNB 47 receives the tracking area update response message from the MME_D 46. The eNB 47 obtains the identification information on the new MME included in the message, and transmits the tracking area update response message to the UE_A 10 on the basis of the reception of the message (S430).

The message includes an information element informing that the update of the tracking area is complete and identification information on the MME_D 46 (the GUMMEI, for example) that is the new MME.

The UE_A 10 receives the tracking area update response message from the eNB 47. The UE_A 10 obtains the identification information on the new MME included in the received message.

Through the foregoing, the MME relocation involved in the tracking area update procedure can be realized without changing the core network type.

Note that as a result of the tracking area update procedure succeeding, the eNB 47 may receive a paging request from the new MME, and a UE may start a service request procedure or a tracking area update procedure.

Furthermore, as a result of the tracking area update procedure succeeding, the UE_A 10 can transmit a service request to the new MME and implement a service request procedure.

1.3.2. First Variation on Tracking Area Update Procedure

Next, a case where the MME_D 46 is not present in the system model illustrated in FIG. 5 will be described.

To be more specific, it is assumed that the eNB 45 stores the MME_A 40 in association with the core network type 1 in the MME information 242. Furthermore, it is assumed that the eNB 45 stores the MME_B 42 in association with the core network type 2.

Note that the eNB 45 stores that a default MME is the MME_A 40. "Default MME" refers to an MME selected as a connection destination by the eNB 45 in the case where there are no special conditions. Additionally, the eNB 45 may store a default core network type (type 1) without storing the information on a specific MME, such as the MME_A 40, as the default MME. In the case where there are no specific conditions, the eNB 45 may select, as the default MME, the MME stored in association with the default core network type (type 1) (that is, the MME_A 40).

Additionally, it is assumed that the eNB 47 stores the MME_C 44 in association with the core network type 1 in the MME information 242. Furthermore, it is assumed that the eNB 47 does not store information on an MME associated with the core network type 2.

Note that the eNB 47 stores that a default MME is the MME_C 44. "Default MME" refers to an MME selected as a connection destination by the eNB 47 in the case where there are no special conditions. Additionally, the eNB 47 may store a default core network type (type 1) without storing the information on a specific MME, such as the MME_B 42, as the default MME. In the case where there are no specific conditions, the eNB 47 may select, as the default MME, the MME stored in association with the default core network type (type 1) (that is, the MME_C 44).

This type of case, namely where the eNB 47 does not have connectivity with the core network type identified as type 2 and the UE_A 10 connecting to the core network identified as type 2 has transmits the tracking area update request, will be described in detail next.

From the trigger for the UE_A 10 to transmit the tracking area update request occurring to the eNB 47 transmitting the redirect request (S402 to 5416) may be the same as the tracking area update procedure involved in the MME relocation described in section 1.3.1, and have the same process as the tracking area update procedure described using FIG. 6. Thus detailed descriptions of that procedure will be omitted.

The procedure from 5416 and so on will be described using FIGS. 7A and 7B. The eNB 47 may determine whether to reject the tracking area update procedure or change the core network and execute the tracking area update procedure on the basis of configuration information. Note that the configuration information may be configuration information set in the eNB 47 by a base station operator, or may be configuration information based on an operator policy determined by a network operator.

Note that rejection of the tracking area update procedure may be executed in the case where the eNB 47 does not have connectivity with an MME configured in a core network conforming to the core network requested by the UE.

Alternatively, the rejection of the tracking area update procedure may be executed in the case where information on an MME configured in a core network conforming to the identification information on the core network requested by the UE is not stored.

Alternatively, the rejection of the tracking area update procedure may be executed in the case where the identification information on the core network requested by the UE is not stored.

A case where the eNB 47 rejects the tracking area update request on the basis of the configuration information will be described with reference to FIG. 7A.

The eNB 47 receives a redirect message from the MME_C 44 (S416). The eNB 47 obtains an information element indicating a request to redirect to another MME included in the received message and attempts MME re-selection on the basis of the obtainment. However, on the basis of the MME information 242 included in the storage 240 of the eNB 47, the eNB 47 confirms that another MME, aside from an MME that has already been selected and whose service area the UE_A 10 is in, cannot be selected (S502). In other words, the eNB 47 confirms that the eNB 47 does not have connectivity with the core network (type 2) 92.

Furthermore, on the basis of the configuration information, the eNB 47 transmits a tracking area update rejection response message to the UE_A 10 in order to reject and end the tracking area update procedure (S504). The message includes an information element indicating that the tracking area update request has been rejected.

Note that the tracking area update rejection response message is a control message responding to the tracking area update request message transmitted by the UE_A 10, and may be a control message including information informing that the tracking area update fails or is rejected.

The UE_A 10 receives the tracking area update rejection response message. On the basis of information indicating that the tracking area update request included in the tracking area update rejection response message has been rejected, the UE_A 10 detects that the tracking area update procedure has failed.

Meanwhile, on the basis of the information indicating that the tracking area update request included in the tracking area update rejection response message has been rejected, the UE_A 10 may cut the PDN connection.

Specifically, the PDN connection may be cut as a result of the UE_A 10 initiating a PDN cutoff procedure. Note that the UE_A 10 may initiate a cutoff request message including an access point name (APN), receive a message in response to the cutoff request message, and complete the PDN cutoff procedure.

Next, a case where the configuration information is set so that a connection is accepted even in the case of different core network types will be described using FIG. 7B.

The eNB 47 receives a redirect message from the MME_C 44 (S416). The eNB 47 obtains an information element indicating a request to redirect to another MME included in the received message and attempts MME re-selection on the basis of the obtainment. However, on the basis of the MME information 242 included in the storage 240 of the eNB 47, the eNB 47 confirms that another MME, aside from an MME that has already been selected and whose service area the UE_A 10 is in, cannot be selected (S502). In other words, the eNB 47 confirms that the eNB 47 does not have connectivity with the core network (type 2) 92.

In the case where the eNB 47 has determined that MME re-selection cannot be carried out, the eNB 47 transmits, on the basis of the configuration information, the tracking area update request message to the MME_C 44 for registering a location in a core network having different identification information (S506).

The message includes the identification information on the MME before moving, the tracking area information indicating the location of the UE_A 10, and identification information meaning that MME re-selection requests are to be stopped, such as "flag2."

Through this, the eNB 47 may change the core network and request that the tracking area information stored in the MME be updated.

The MME_C 44 receives the tracking area update request message from the eNB 47. The MME_C 44 obtains the identification information old GUMMEI on the MME before moving and the identification information such as the flag2 included in the message. Furthermore, on the basis of the obtained old GUMMEI, the MME_C 44 transmits the context request message to the MME_B 42 and again requests the context of the UE_A 10 (S508).

The message includes the message received from the eNB 47. Identification information on the core network type of the MME_C 44 may be included as well.

The MME_B 42 receives the context request message from the MME_C 44. Furthermore, the MME_B 42 transmits a context response message to the MME_C 44 (S510).

Here, as a result of receiving identification information such as the flag2 included in the message received from the MME_C 44, the MME_B 42 may transmit the context response message without carrying out the MME re-setting determination process when the context request has been received.

Note that the MME_B 42 includes the context of the UE_A 10 in the context response message. The MME_B 42 may further include the core network type of the MME_B 42.

The MME_C 44 receives the context response message from the MME_B 42. On the basis of the flag2 included in the tracking area update request message received from the eNB 47, the MME_C 44 stores the context of the UE_A 10 included in the message received from the MME_B 42 in the storage. Furthermore, the MME_C 44 updates the tracking area information on the UE_A 10, included in the context of the UE_A 10 stored in the storage, to the tracking area information on the UE_A 10 included in the tracking area update request message received from the eNB 47.

Next, the MME_C 44 transmits the tracking area update response message to the eNB 47 (S514).

Here, as a result of receiving the identification information such as the flag2 included in the message received from the eNB 47, the MME_C 44 may transmit the tracking area update response message without carrying out the MME re-setting determination process when the MME_C 44 has received the context response from the MME_B 42.

Alternatively, as a result of receiving the flag2 included in the tracking area update request message received from the eNB 47, the MME_C 44 may transmit the context response message without including the core network type of MME_B 42 therein.

Furthermore, in response to the core network type not being included in the context response message, the MME_C 44 may transmit the tracking area update response message without carrying out the MME re-setting determination process when the MME_C 44 has received the context response from the MME_B 42.

Note that the MME_C 44 transmits, to the eNB 47, the tracking area update response message including information identifying the MME_C 44. Note that the information identifying the MME_C 44 may be the GUMMEI identifying the MME_C 44. Furthermore, the MME_C 44 transmits the message including an information element informing that the tracking area update is complete.

The eNB 47 receives the tracking area update response message from the MME_C 44. The eNB 47 transmits the tracking area update response message to the UE_A 10 on the basis of reception of the message (S516). The eNB 47 may include an information element informing that the update of the tracking area for which the core network has been changed is complete and the identification information on the MME_C 44 that is the new MME in the message.

Meanwhile, in S414 of FIG. 6, the MME_C 44 may receive the context of the UE_A 10 from the MME_B 42, and hold the context of the UE_A 10 until the MME_C 44 receives the tracking area update request transmitted by the eNB 47 again. Alternatively, the MME_C 44 may have a timer 1 for standing by for a set period, and may hold the context of the UE_A 10 until the timer 1 expires. This makes it possible for the MME_C 44 to wait for the tracking area update request transmitted by the eNB 47 for a set amount of time.

In this case, the MME_C 44 receives again the tracking area update request message from the eNB 47 before the timer 1 expires, and in the case where the flag2 is included in the received message, the MME_C 44 may store the context being held in the storage. This makes it possible to omit the context request procedure that is executed again for the MME_B 42 (S512), including the transmitting and receiving of the context request (S508), the transmitting and receiving of the context response (S510), and the like.

Rather than being limited thereto, the tracking area update procedure that is executed again (S518), including the transmitting and receiving of the tracking area update request (S506), the transmitting and receiving of the tracking area update response (S514), the transmitting and receiving of the context request (S508), and the transmitting and receiving of the context response (S510), may be omitted.

In this case, the context response message, described with reference to S414 in FIG. 6, is transmitted including the context of the UE_A 10. Furthermore, in the case where the MME re-selection cannot be carried out, the context response message may be a notification for requesting that the core network be changed and the tracking area be updated.

Additionally, after transmitting the context response in this manner, the MME_B 42 may start the count of a timer 2 for storing the context of the UE_A 10 in the storage for a set period and then delete the context of the UE_A 10 in the case where the timer 2 has expired. Through this, the MME_B 42 may detect that the update of the tracking area for which the UE_A 10 has changed the core network is complete.

Furthermore, the MME_C 44 transmits the redirect request message (S416), which is transmitted to the eNB 47 on the basis of reception of the context response, including the context of the UE_A 10. Further still, in the case where the MME re-selection cannot be carried out, the redirect request message may be a notification for requesting that the core network be changed and the tracking area be updated.

Additionally, after transmitting the redirect request message in this manner, the MME_C 44 may store the context of the UE_A 10 and the tracking area information in the storage for a set period, and start the count of a timer 3. Furthermore, the MME_C 44 may delete the context of the UE_A 10 in the case where the timer 3 has expired. This makes it possible for the MME_C 44 to register the tracking area of the UE_A 10 in the MME_C 44 until the timer 3 expires. Note that in the case where a message requesting that the tracking area of the UE_A 10 be updated is newly received before the timer 3 expires, the MME_C 44 may stop the count of the timer 3 and register the tracking area of the UE_A 10.

Furthermore, in the case where the eNB 47 receives the redirect request message in this manner but cannot select an MME included in the same core network, the eNB 47 may transmit a tracking update response including information identifying the MME_C 44, such as the GUMMEI identifying the MME_C 44, to the UE_A 10, and complete the tracking area update procedure, without transmitting the tracking area update request (S506).

Note that in the case where the MME re-selection has been determined to be carried out, as in S418 of FIG. 6, the eNB 47 may transmit a message requesting that the context of the UE_A 10 be deleted to the MME_C 44.

The tracking area update procedure (S518) may be omitted in this manner.

1.3.3. Second Variation on Tracking Area Update Procedure

Next, a method in which the eNB 47 detects the identification information on the core network to which the UE_A 10 is connected on the basis of the reception of the tracking area update request transmitted by the UE_A 10, and selects and connects an MME on the basis of the core network identification information, will be described using FIG. 8.

Figure 8:
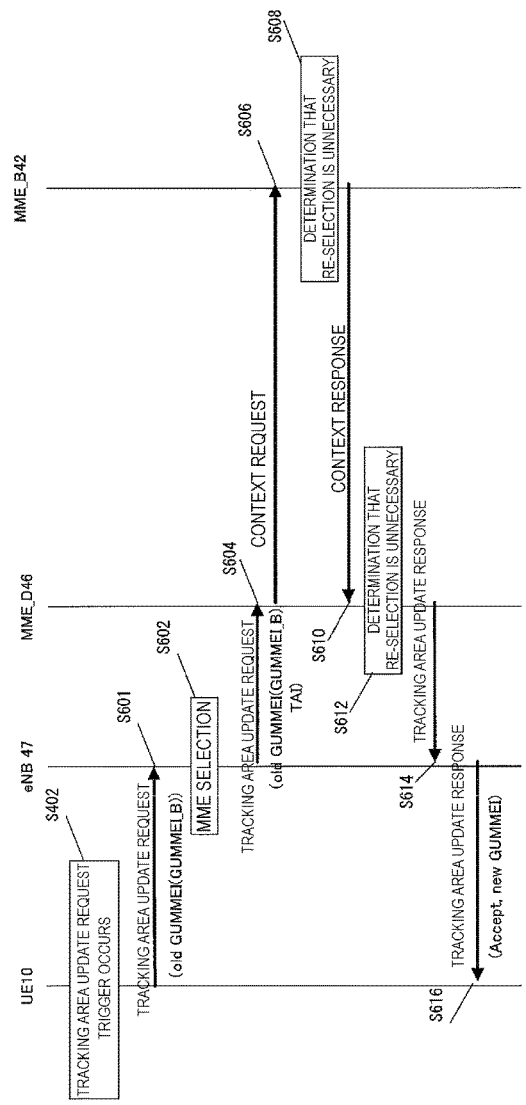
FIG. 8 is a diagram illustrating a second variation on the tracking area update procedure.

FIG. 8 illustrates the tracking area update procedure. Note that here, the MME information included in the storage 240 of the eNB 47 may be information associating the MME identification information and the service area information as in FIG. 3B, or may be information furthermore associating the core network type with the information indicated in FIG. 3B as indicated in FIG. 3C.

In the case where the MME information 242 is constituted of MME identification information and area information as indicated in FIG. 3B, the MME identification information may be the GUMMEI.

Additionally, the MME group number included in the GUMMEI at this time may indicate the type of core network that the MME connects.

In other words, in FIG. 8, it is assumed that the eNB 47 has a function for identifying the core network that the MME connects on the basis of the MME identification information.

First, a trigger for transmitting the tracking area update request occurs in the UE_A 10 (S402). The trigger for transmitting the tracking area update request is not particularly limited, and the same trigger as a conventional trigger may be used, such as the trigger occurring periodically when a timer expires. At this time, it is assumed that the UE_A 10 is moving in a connection region of the eNB 47.

Next, on the basis of the tracking area update request trigger, the UE_A 10 transmits a tracking area update request message to the eNB 47 (S601).

The UE_A 10 may transmit the message including the identification information on the UE_A 10, the identification information on the MME_B 42 to which the UE_A 10 is connected before moving, and the tracking area information indicating the location of the UE_A 10. Note that the identification information on the UE_A 10 may employ a globally unique temporary identity (GUTI) assigned globally and uniquely to the UE_A 10. The identification information on the MME_B 42 may employ a GUMMEI. Additionally, the GUMMEI may be configured to be included in the GUTI.

Note that the identification information on the MME to which the UE was connected before moving (the old GUMMEI) may be configured including identification information identifying the core network to which the UE_A 10 was connected. More specifically, the group identification information included in the old GUMMEI may be information corresponding to the identification information identifying the core network to which the UE_A 10 was connected.

Alternatively, the UE_A 10 may include identification information identifying the core network, which is information independent from the identification information on the MME to which the UE_A 10 was connected before moving, in the message.

The eNB 47 receives the tracking area update request message from the UE_A 10. The eNB 47 obtains the identification information on the core network of the UE_A 10 (the old GUMMEI or the independent core network type identification information) included in the message. The eNB 47 selects, from the MME information 242, an MME for which the area information and the core network type information best conform to the UE (S602).

On the basis of this MME selection, the eNB 47 transmits the tracking area update request message to the selected MME (the MME_D 46, in this case) (S604).

The message includes the identification information (old GUMMEI) on the MME to which the UE_A 10 was connected before moving and the tracking area information indicating the location of the UE_A 10.

Here, the identification information on the pre-move MME is the GUMMEI of the MME_B 42. The tracking area identification information is location registration area information on the UE.

The MME_D 46 receives the tracking area update request from the eNB 47. The MME_D 46 transmits the context request message to the MME_B 42 on the basis of the MME identification information included in the message (S606).

The message includes the tracking area update request message received from the eNB 47. Identification information on the core network that the MME_D 46 connects may be included as well.

The MME_B 42 receives the context request message from the MME_D 46. The MME_B 42 obtains the identification information on the core network that the MME_D 46 connects, which is included in the message, compares the obtained core network with the core network that the MME_B 42 connects, and determines whether or not MME re-selection is necessary. In FIG. 8, the obtained core network (the core network that the MME_D 46 connects) and the core network of the MME_B 42 are the same, and the MME re-selection is thus determined to be unnecessary (S608).

The MME_B 42 transmits the context response message to the MME_D 46 on the basis of the determination that re-selection is unnecessary (S610).

The message includes an MM context, an EPS bearer context, and the like, which are contexts of the UE_A 10 stored in the storage of the MME_B 42.

Meanwhile, in the case where the MME_B 42 receives from the MME_D 46 the context request message that does not include the identification information on the core network that the MME_D 46 connects, the MME_B 42 may transmit the context response message to the MME_D 46 on the basis of the reception of the message (S610).

The message includes the context of the UE_A 10 and the identification information on the core network that the MME_B 42 connects. The context of the UE_A 10 may include the conventional MM context, EPS bearer context, and the like. The MME_D 46 receives the context response message from the MME_B 42 as a response to the context request message.

At this time, in the case where the received message includes the context of the UE_A 10 and the identification information on the core network that the MME_B 42 connects, the MME_D 46 obtains the identification information on the core network that the MME_B 42 connects and compares the obtained identification information with the type of core network that the MME_D 46 connects. In FIG. 8, the core network that the MME_B 42 connects is the same as the core network that the MME_D 46 connects, and thus the MME_D 46 determines that the MME re-selection is unnecessary (S612).

The MME_D 46 stores the context of the UE_A 10 included in the message in the storage on the basis of the reception of the context or the determination that re-selection is unnecessary. Furthermore, the MME_D 46 updates tracking area information included in the context using tracking area information indicating the location of the UE_A 10, which is included in the tracking area update request message received from the eNB 47.

The MME_D 46 transmits the tracking area update response message to the eNB 47 on the basis of the reception of the context response message (S614). The message includes an information element informing that the tracking area update is complete.

The eNB 47 receives the tracking area update response message from the MME_D 46. The eNB 47 transmits the tracking area update response message to the UE_A 10 on the basis of the reception of the message (S616). The message includes an information element informing that the update of the tracking area is complete and identification information on the MME_D 46 (the GUMMEI, for example) that is the new MME.

The UE_A 10 receives the tracking area update response message from the eNB 47. The UE_A 10 obtains the identification information on the new MME included in the received message.

As described thus far, the eNB 47 can select the MME on the basis of the core network identification information by the eNB 47 storing the MME core network type and the UE_A 10 transmitting information identifying the core network, and thus the number of processes in the tracking area update procedure can be reduced.

Note that in one example of the tracking area update procedure involved in MME relocation as described in section 1.3.1, it is not absolutely necessary for the eNB 47 to store the identification information on the core network of the MME in advance. Accordingly, for example, in the case where the eNB 47 stores the identification information on the core network of the MME and the UE_A 10 furthermore transmits the tracking area update request including the core network identification information, the connection may be made on the basis of the MME selection process described in the present variation. However, in other cases, the eNB 47 may carry out processing such as connecting using the method according to the tracking area update procedure involved in MME relocation described in section 1.3.1.

Alternatively, the eNB 47 may hold in advance configuration information for detecting whether to connect on the basis of the MME selection process described in the present variation, or to connect using the method according to the tracking area update procedure involved in MME relocation described in section 1.3.1, and the eNB 47 may then select the processing on the basis of the configuration information. Note that the configuration information may be information set in the eNB 47 by an operator on the basis of an operator policy of the mobile operator or the like.

An embodiment of the invention and variations thereof have been described in detail thus far with reference to the drawings, but the specific configuration is not limited to the embodiment. Other designs and the like that do not depart from the essential spirit of the invention also fall within the scope of the patent claims.

Additionally, the program run on the devices in the embodiments are programs that control a CPU (programs that cause a computer to function) so as to realize the functions of the above-described embodiments. The information handled by these devices is temporarily held in a transitory storage device (RAM, for example) at the time of processing, and is then stored in various storage devices such as a ROM and an HDD, read out by the CPU as necessary, and edited and written.

Here, a semiconductor medium (a ROM, a non-volatile memory card, or the like, for example), an optical recording medium/magneto-optical recording medium (a digital versatile disc (DVD), a magneto optical disc (MO), a mini disc (MD), a compact disc (CD), a BD, or the like, for example), a magnetic recording medium (magnetic tape, a flexible disk, or the like, for example), and the like can be given as examples of recording media for storing the programs. In addition to realizing the functions of the above-described embodiments by executing programs that have been loaded, there are also cases where the functions of the present invention are realized by the programs running cooperatively with an operating system, other application programs, or the like on the basis of instructions included in those programs.

When delivering these programs to market, the programs can be stored in a portable recording medium, or transferred to a server computer connected via a network such as the Internet. In this case, the storage device serving as the server computer is of course also included in the present invention.

Additionally, each device in the above-described embodiment may be partially or completely realized as large scale integration (LSI) circuit, which is a typical integrated circuit. The functional blocks of each device may be individually realized as chips, or may be partially or completely integrated into a chip. The circuit integration technique is not limited to LSI, and the integrated circuits for the functional blocks may be realized as dedicated circuits or a multipurpose processor. Furthermore, if advances in semiconductor technology produce circuit integration technology capable of replacing LSI, it is of course possible to use integrated circuits based on the technology.

Additionally, although the above-described embodiment mention LTE and a WLAN (IEEE 802.11a/b/n, for example) as examples of the wireless access network, the connections may be made with WiMAX instead of a WLAN.

REFERENCE SIGNS LIST

1 Communication system
10 UE_A
15 UE_B
30 PGW
35 SGW
40 MME_A
42 MME_B
45 eNB
50 HSS
55 AAA
60 PCRF
65 ePDG
70 WLAN ANa
75 WLAN ANb
80 LTE AN
90 Core network (type 1)
92 Core network (type 2)
100 PDN_A
102 PDN_B

The invention claimed is:

1. A first core network device comprised in a first core network, the first core network device comprising:
   transmitting and receiving circuitry configured for:
      receiving a tracking area update request message from a base station device; and
      transmitting, to the base station device, a request message, in a case that the first core network device is configured to determine that it is necessary to redirect the tracking area update request message to another core network device,
   wherein
      the request message contains information indicating a second core network,
      the information indicating the second core network is configured for being used, by the base station device, for selecting a second core network device comprised in the second core network,
      the tracking area update request message is configured for being transmitted, by the base station device, to the second core network device after the second core network device has been selected,
      the first core network and the second core network exist within an identical PLMN, and
      the second core network is a dedicated core network for a specific terminal device.

2. A first core network device comprised in a first core network, the first core network device comprising:
   transmitting and receiving circuitry configured for:
      receiving a tracking area update request message from a base station device; and
      transmitting, to the base station device, a request message, in a case that the first core network device is configured to determine that it is necessary to redirect the tracking area update request message to another core network device,
   wherein the request message contains information indicating a second core network device comprised in a second core network,
the information indicating the second core network device is configured for being used, by the base station device, for selecting the second core network device,
the tracking area update request message is configured for being transmitted, by the base station device, to the second core network device after the second core network device has been selected,
the first core network and the second core network exist within an identical PLMN, and
the second core network is a dedicated core network for a specific terminal device.

3. A base station device comprising:
transmitting and receiving circuitry configured for:
receiving a tracking area update request message from a terminal device;
transmitting the tracking area update request message to a first core network device comprised in a first core network;
receiving a request message containing information indicating a second core network from the first core network device;
selecting, based on the information indicating the second core network, a second core network device comprised in the second core network; and
transmitting the tracking area update request message to the second core network device after the second core network device has been selected,
wherein
the first core network and the second core network exist within an identical PLMN, and
the second core network is a dedicated core network for a specific terminal device.

4. A base station device comprising:
transmitting and receiving circuitry configured for:
receiving a tracking area update request message from a terminal device;
transmitting the tracking area update request message to a first core network device comprised in a first core network;
receiving a request message containing information indicating a second core network device comprised in a second core network from the first core network device;
selecting the second core network device based on the information indicating the second core network device; and
transmitting the tracking area update request message to the second core network device after the second core network device has been selected,
wherein
the first core network and the second core network exist within an identical PLMN, and
the second core network is a dedicated core network for a specific terminal device.

5. A communication control method for a first core network device comprised in a first core network, the communication control method comprising:
receiving a tracking area update request message from a base station device; and
transmitting, to the base station device, a request message, in a case that the first core network device is configured to determine that it is necessary to redirect the tracking area update request message to another core network device,
wherein
the request message contains information indicating a second core network,
the information indicating the second core network is configured for being used, by the base station device, for selecting a second core network device comprised in the second core network,
the tracking area update request message is configured for being transmitted, by the base station device, to the second core network device after the second core network device has been selected,
the first core network and the second core network exist within an identical PLMN, and
the second core network is a dedicated core network for a specific terminal device.

6. A communication control method for a first core network device comprised in a first core network, the communication control method comprising:
receiving a tracking area update request message from a base station device; and
transmitting, to the base station device, a request message, in a case that the first core network device is configured to determine that it is necessary to redirect the tracking area update request message to another core network device,
wherein
the request message contains information indicating a second core network device comprised in a second core network,
the information indicating the second core network device is configured for being used, by the base station device, for selecting the second core network device,
the tracking area update request message is configured for being transmitted, by the base station device, to the second core network device after the second core network device has been selected,
the first core network and the second core network exist within an identical PLMN, and
the second core network is a dedicated core network for a specific terminal device.

7. A communication control method for a base station device, the communication control method comprising:
receiving a tracking area update request message from a terminal device;
transmitting the tracking area update request message to a first core network device comprised in a first core network;
receiving a request message containing information indicating a second core network from the first core network device;
selecting, based on the information indicating the second core network, a second core network device comprised in the second core network; and
transmitting the tracking area update request message to the second core network device after the second core network device has been selected,
wherein
the first core network and the second core network exist within an identical PLMN, and
the second core network is a dedicated core network for a specific terminal device.

8. A communication control method for a base station device, the communication control method comprising:

receiving a tracking area update request message from a terminal device;
transmitting the tracking area update request message to a first core network device comprised in a first core network;
receiving a request message containing information indicating a second core network device comprised in a second core network from the first core network device;
selecting the second core network device based on the information indicating the second core network device; and
transmitting the tracking area update request message to the second core network device after the second core network device has been selected,
wherein
the first core network and the second core network exist within an identical PLMN, and
the second core network is a dedicated core network for a specific terminal device.

* * * * *